Oct. 30, 1962  C. WILSON  3,060,922
DEEP FAT FRYING APPARATUS
Filed Nov. 23, 1959
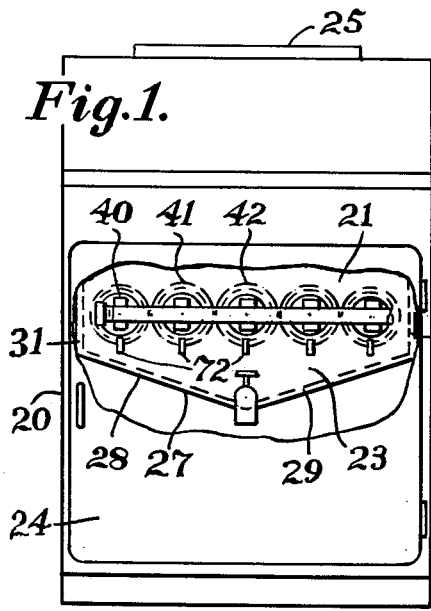
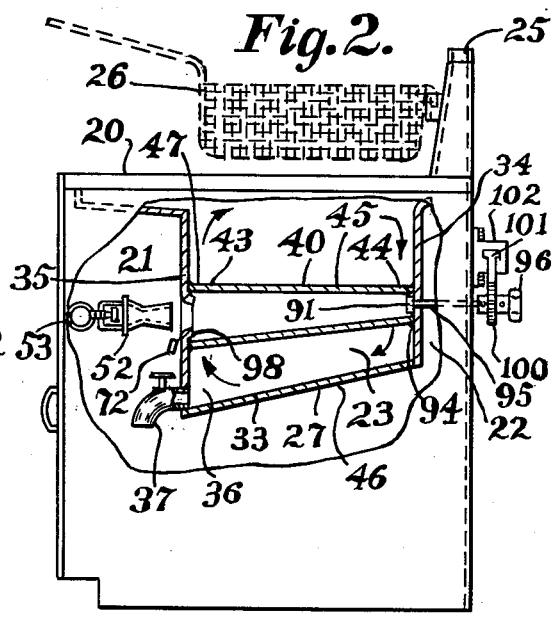
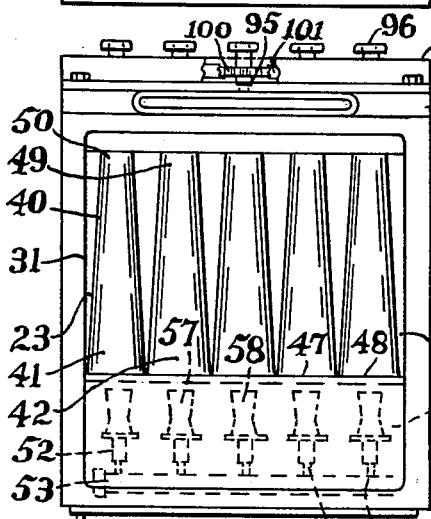
INVENTOR.
CHRISTIAN WILSON
BY
Pearson & Pearson
ATTORNEYS

United States Patent Office 3,060,922
Patented Oct. 30, 1962

3,060,922
DEEP FAT FRYING APPARATUS
Christian Wilson, 1 Friendship St., Billerica, Mass.
Filed Nov. 23, 1959, Ser. No. 854,744
7 Claims. (Cl. 126—391)

This invention relates to deep fat fryers for the frying of foods in homes, restaurants and the like.

In general, deep fat fryers usually include a cabinet having a frying well in the top for containing the frying liquid, one or more fry baskets fitting into the well for containing the food to be deep fried and heating tubes in the lower portion of the frying well for heating the liquid. In the electric type the well is usually shallow with heating elements lining the side walls of the well. In the gas type the well is usually deep with relatively large combustion gas tubes extending across the well, intermediate of the height thereof from a forward air chamber to a rearward flue chamber.

In the prior art relating to gas heated fryers it has been customary to add to the above mechanism, various baffles, shields and other structure for retarding heat, evenly distributing heat, preventing the accumulation of food particles on the tubes or for securing higher efficiency. For example in my prior Patent No. 1,944,555, issued March 19, 1935, and now expired, an internal shield or baffle was shown in the circular frying well and an angular shield was mounted over each tapered combustion tube for overcoming the disadvantageous deposit of food particles. However, such shields and baffles add substantially to the cost of manufacture and may reduce efficiency of the fryer while performing their function of maintaining the frying liquid free of contamination.

The object of this invention is to provide a deep fryer of simple, rugged construction which is free of protective baffles but which heats and circulates the fry liquid for an extended period with little tendency toward particle accumulation on the tubes.

Another object of the invention is to provide a deep fryer in which the position and shape of the novel combustion tubes in the well, and the means for heating the tube, combine to keep the exterior of the tube free of accumulations of food particles.

A further object of the invention is to provide a deep fryer with heating tubes which are of maximum diameter, near the flame, where hot liquid tends to rise and which are of minimum diameter, far from the flame, where the fry liquid tends to sink to the bottom of the well with any food particles contained therein. My tapered combustion tubes thus serve not only to efficiently conduct heat but the large diameter portion serves as a horizontal baffle in the hottest part of the well for trapping ascending food particles.

Other objects and advantages of the invention will be apparent from the claims, the description of the drawing and from the drawing in which:

FIG. 1 is a front view.

FIG. 2 is a side view.

FIG. 3 is plan view of a deep fryer in accordance with this invention, parts being broken away for clarity.

FIG. 4 is an enlarged side view, in section, along the centre line of the venturi tube shaped air supply tubes of the invention.

FIG. 5 is an enlarged front view of the damper means of the invention, and

FIG. 6 is an enlarged diagrammatic view showing the gas heating means of the invention.

In the drawing, the deep fryer cabinet 20 includes the air chamber 21 in the forward portion, the flue chamber 22 in the rearward portion, the frying well 23 between the chambers, the door 24 and the flue 25. A typical fry basket 26 is shown in dotted lines in FIG. 2 to illustrate the manner in which the food is cooked in hot grease or oil in the frying well 23. The bottom 27 of the well 23 is inclined downwardly as at 28 and 29 from each side wall 31 and 32 and inclined downwardly as at 33 from the rear wall 34 toward the centre of the bottom of the front wall 35 to form a sump 36 proximate the drain cock 37 by which the well 23 may be drained of frying liquid.

Cooperating with the downwardly and forwardly inclined bottom 27 of the frying well 23 is the gas fired heating means of the invention to form a sediment trap in the sump 36, a desirable clockwise circulation of hot liquid and a minimum of particle accumulation on the combustion tubes. The gas fired heating means 40 includes a plurality of truncated conical combustion tubes such as 41 and 42, each of circular cross section and each having a large circular end 43 opening into the air chamber 21 and a small circular end 44 opening into the flue chamber 22. The upper portion 45 of each truncated conical combustion tube is horizontal while the lower portion 46 inclines upwardly from the air chamber 21 to the flue chamber 22. The tube ends are suitably sealed to the forward and rear walls 35 and 34 to prevent leaks as by welding and the central longitudinal axes of the tubes 41 and 42 are parallel. Preferably the large end portions 47 and 48 of the tubes are in abutting engagement with each other so that they form a horizontal baffle across the forward portion of well 23 above the sump 36 adapted to intercept nearly all particles tending to rise to the top of the frying liquid in the forward portion of the well. On the other hand the small end portions 49 and 50 of the combustion tubes 41 and 42 are relatively widely spaced apart whereby particles of food may easily pass therebetween in clockwise circulation of the frying liquid as depicted in FIG. 2. In addition the reduced diameter of the small ends 49 and 50 minimizes the tube area in the path of descending food particles to permit the same to continue through between the tubes toward the sump 36 and the trap partition formed by the large ends of the tubes.

The usual gas supply means, well known in the trade and consisting of a source of gas under pressure, a feed pipe, automatic controls, valves and pilot light means are provided but not shown herein. Reference is made to Patent 1,630,309 to Pitman of May 31, 1927, Patent 2,000,609 to Pitman of May 7, 1935, or Patent 2,867,164 to Lutze of January 6, 1959, for suitable mechanism of this nature. The gas burner means 52 of the invention includes a manifold 53 fed with pressurized gas in any convenient manner and mounted across air chamber 21 at the level of the centres of the combustion tubes 41 and 42 but at a spaced distance from the large ends 47 and 48 thereof. Manifold 53 has a plurality of gas feed nipples such as 54 and 55 spaced therealong each opposite the centre of one of the tubes such as 41 and each exteriorly threaded as at 56. A plurality of venturi tube shaped air supply members such as 57 and 58 are provided, each member being unitary and including a venturi tube section 60 and a bracket section 61, the latter being interiorly threaded at 62 for support and axial adjustment on a nipple 55. The venturi tube section 60 of each member preferably includes a relatively short flared portion 63 forming a converging inlet 64 and a relatively elongated portion 65 forming a diverging outlet 66, there being a constricted throat at 67. The mouth 68 of the converging inlet 64 is closely spaced from the mouth 69 of the nipple 55 and the mouth 71 of the diverging outlet 66 is closely spaced from the large end 43 of the combustion tube. Pressurized gas emitted from the mouth 69 enters the mouth 68 of the inlet 64 drawing air from air chamber 21 therealong, the mixed gas and air fuel passing through the constricted throat 67 and out of the mouth 71 of the diverging outlet 66 where it is ignited by the pilot 72. The hot combustion gases, as shown diagrammatically in FIG. 6, then enter the large end 47 of the truncated conical combustion tube 41 to apply the maximum heat to the large surface area at the large diameter portion 47 of the tube. The tip of the flame heats the small end portion of the tube as the combustion gases pass outwardly into flue chamber 22.

Preferably a closure disc 74 is inset in the mouth 71 of each venturi tube member 60, and provided with alternate long and short radial slots 75 and 76 for forming a radial annular pattern of individual streams of the fuel mixture. Heat and flame is thus directed peripherally, all around the interior of the combustion tube, at the large end portion especially, whereby the cooking liquid is slightly hotter in the forward portion of well 23 than in the rearward portion at a level below the level of the fry basket. A clockwise convection current is thus secured with the current rising in the forward portion of well 23, moving rearwardly through the basket in the upper portion of the well to uniformly cook the food therein, then descending in the rearward portion of the well and finally moving forwardly along the bottom 27 of the well.

Preferably also an annular, air control, disc 78 is provided, the disc 78 being knurled on its outside periphery and interiorly threaded at 79 for axial movement on the threads 56 of nipple 55 when manually rotated. A locking nut 80 is also provided for seating the disc 78 at any desired axial position relative to nipple 55 and the mouth 68 of the converging inlet 64 thereby controlling the volume of air drawn between the knurled periphery 81 of the disc 80 and the mouth 68.

As best shown in FIG. 5 damper means 90 may be provided in the small ends of the combustion tubes 41 and 42 to control the dwell of the flame in the tubes as well as to control the sound of the burners. A closure plate 91 is secured in each tube end 44, the plate 91 having a segmental aperture 92 extending angularly more than 180° for example, 190°. A segmental damper 93 is rotatably mounted at 94 to plate 91 for turning by a rod 95 and a knob 96, the latter being on the outside of cabinet 20. The damper 93 extends angularly at least ten degrees less than the aperture 92 for example, 170° so that it may mask the aperture in various amounts but never entirely close the aperture and thereby extinguish the burners.

The only baffle plate I have found it sometimes desirable to use in the device of this invention is the annular baffle 98 mounted in the large end of each combustion tube 41 or 42 by welding or other suitable means. The plate 98 is inclined inwardly toward the small end of the tubes and serves to intercept any back flow therein, especially where the damper 93 is partially closed. It should be noted, however, that baffle 98 is a part of the combustion means 40 and that there are no special baffles, guides, shields or partitions in the well 23 except those formed by the novel shape of the combustion tubes themselves.

As best shown in FIGS. 2 and 3, I prefer to provide means adjusting all of the dampers 93 simultaneously in equal amounts from the side or top of the cabinet, thereby permitting adjustment when the cabinet is backed up closely to a wall. The rods 95 are thus provided with gears 100, each meshed with a gear rack 101, slidable laterally in brackets such as 102 whereby lateral movement of rack 101 opens or closes the dampers in equal amounts.

I claim:

1. In a deep fat fryer of the type having a cabinet with an air chamber a flue chamber and a frying well between said chambers, the combination of a plurality of truncated, conical, combustion tubes mounted across said frying well for heating fat therein, each said tube converging in diameter from a large end connecting with said air chamber to a small end connecting with said flue chamber, the large ends of said combustion tubes being juxtaposed for forming a sediment baffle and the small ends of said combustion tubes being spaced apart for freely passing sediment therebetween and gas flame means, mounted in said air chamber, said means including a plurality of venturi, air mixing tubes, each having a radially slotted outlet closure at a spaced distance from the large end of one of said combustion tubes directing flame peripherally entirely around the interior of said large end for applying maximum heat thereto.

2. A combination as specified in claim 1 wherein said truncated conical combustion tubes are mounted across said frying well with their uppermost portions horizontal for horizontally supporting a fry basket in said well.

3. A combination as specified in claim 1 plus an annular baffle plate mounted in the large end of each said combustion tube, said baffle plate being inclined inwardly toward the small end of the tube for intercepting any back flow of combustion gases.

4. A combination a sspecified in claim 1 plus a damper plate having a segmental aperture therethrough mounted in the small end of each said combustion tube; a damper, comprising a segment at least ten degrees smaller angularly than said aperture rotatably mounted on said plate and mechanism, operable from outside said cabinet, for rotating said dampers simultaneously in equal amounts.

5. In a deep fat fryer of the type having a cabinet with an air chamber, a flue chamber, a frying well between said chambers and a plurality of spaced gas-air mixing tubes mounted in horizontal alignment in said air chamber, the combination of a plurality of tapered combustion tubes extending generally horizontally through, and across, said frying well, intermediate of the height thereof, the large ends of said combustion tubes being juxtaposed and each opposite one of said mixing tubes for securing maximum heat therefrom and the small ends of said combustion tubes being spaced apart to form passages therebetween which increasingly diverge from said large ends to said small ends for freely passing liquid fat and sediment downwardly in said well, an annular, integral baffle in the large end of each said combustion tube, said baffle inclining inwardly toward the small end of said tube for intercepting any back flow of gases, damper means in the small end of each said combustion tube and mechanism, operable from outside said cabinet for actuating said dampers simultaneously in equal amounts.

6. A combination as specified in claim 5 wherein the upper portions of said combustion tubes are horizontal for supporting a fry basket thereon but the lower portions of said combustion tubes incline upwardly from the large end thereof to the small end thereof for guiding combustion gases upwardly toward said upper portions.

7. A combination as specified in claim 5 wherein each said gas-air mixing tube includes a diverging outlet and a closure disc inset in the mouth of said diverging outlet, said closure disc having an annular pattern of radially disposed alternate long and short slots for emitting multiple streams of fuel therefrom.

References Cited in the file of this patent

UNITED STATES PATENTS

| | | |
|---|---|---|
| 2,431,753 | Holderle et al. | Dec. 2, 1947 |
| 2,450,790 | Greaves | Oct. 5, 1948 |
| 2,692,644 | Murray | Oct. 26, 1954 |
| 2,712,308 | Keating | July 5, 1955 |

FOREIGN PATENTS

| | | |
|---|---|---|
| 168,509 | Great Britain | Sept. 8, 1921 |